(12) United States Patent
Kray et al.

(10) Patent No.: US 8,777,576 B2
(45) Date of Patent: Jul. 15, 2014

(54) METALLIC FAN BLADE PLATFORM

(75) Inventors: Nicholas Joseph Kray, Cincinnati, OH (US); Gregory Allen Platz, Jr., Blue Ash, OH (US); Matthew Robert Hastings, Cincinnati, OH (US); Gary Willard Bryant, Jr., Mason, OH (US); Justin Jeffrey Kral, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 410 days.

(21) Appl. No.: 13/214,718

(22) Filed: Aug. 22, 2011

(65) Prior Publication Data
US 2013/0052012 A1 Feb. 28, 2013

(51) Int. Cl.
*F01D 5/22* (2006.01)

(52) U.S. Cl.
USPC ...................................... 416/190; 416/193 R

(58) Field of Classification Search
USPC ........... 416/2, 190, 193 R, 193 A, 196 R, 248
See application file for complete search history.

(56) References Cited

U.S. PATENT DOCUMENTS

| | | | |
|---|---|---|---|
| 3,294,364 A | 12/1966 | Stanley | |
| 3,625,634 A | 12/1971 | Stedfeld | |
| 3,712,757 A | 1/1973 | Goodwin | |
| 4,655,687 A | 4/1987 | Atkinson | |
| 5,049,035 A | 9/1991 | Marlin | |
| 5,277,548 A | 1/1994 | Klein et al. | |
| 5,281,096 A | 1/1994 | Harris et al. | |
| 5,375,978 A | 12/1994 | Evans et al. | |
| 5,464,326 A | 11/1995 | Knott | |
| 5,466,125 A | 11/1995 | Knott | |
| 5,890,874 A | 4/1999 | Lambert et al. | |
| 5,957,658 A | 9/1999 | Kasprow et al. | |
| 6,217,283 B1 | 4/2001 | Ravenhall et al. | |
| 6,447,250 B1 | 9/2002 | Corrigan et al. | |
| 6,832,896 B1 * | 12/2004 | Goga et al. | 416/191 |
| 6,991,428 B2 | 1/2006 | Crane | |
| 7,153,099 B2 | 12/2006 | Queriault et al. | |
| 2005/0063826 A1 | 3/2005 | Queriault et al. | |
| 2008/0232969 A1 * | 9/2008 | Brault et al. | 416/219 R |

FOREIGN PATENT DOCUMENTS

| | | |
|---|---|---|
| AU | 216406 | 5/1958 |
| GB | 2006883 | 5/1979 |

* cited by examiner

*Primary Examiner* — Edward Look
*Assistant Examiner* — Maxime Adjagbe
(74) *Attorney, Agent, or Firm* — William Scott Andes; Trego, Hines & Ladenheim, PLLC

(57) ABSTRACT

A platform is provided for use between adjacent fan blades joined to a rotor disk to provide an inner flowpath boundary. The platform includes: a metallic arcuate body with opposed forward and aft ends and opposed lateral edges; and a pair of frangible wings that extend from the lateral edges laterally and radially beyond the body.

9 Claims, 5 Drawing Sheets

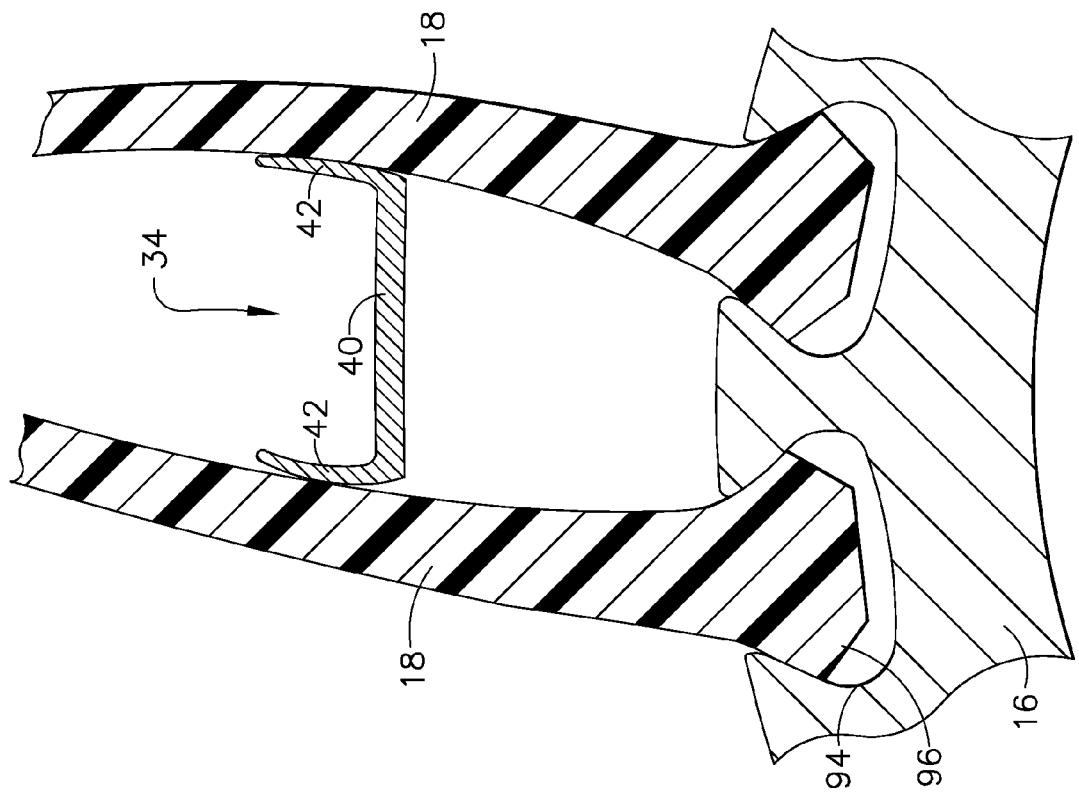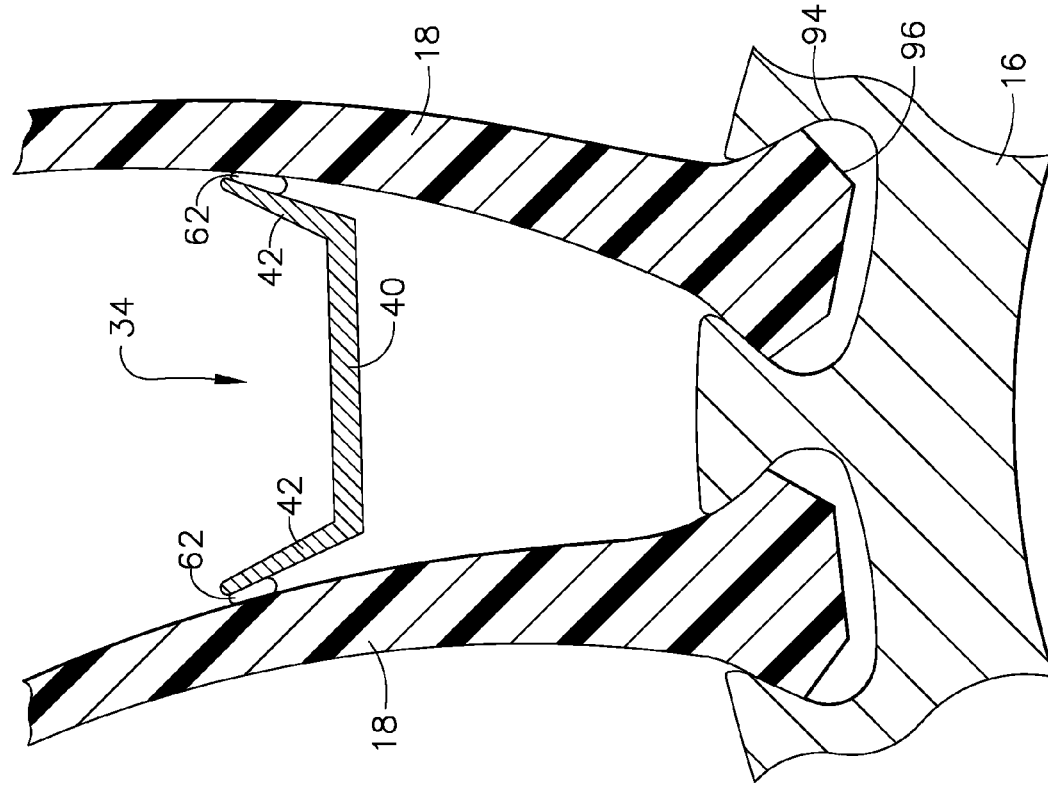

METALLIC FAN BLADE PLATFORM

BACKGROUND OF THE INVENTION

This invention relates generally to gas turbine engine turbines and more particularly to discrete airflow platforms disposed between adjacent fan blades in such engines.

A turbofan gas turbine engine used for powering an aircraft in flight typically includes, in serial flow communication, a fan assembly, a low pressure compressor or "booster", a high pressure compressor, a combustor, a high pressure turbine, and a low pressure turbine. The combustor generates combustion gases that are channeled in succession to the high pressure turbine where they are expanded to drive the high pressure turbine, and then to the low pressure turbine where they are further expanded to drive the low pressure turbine. The high pressure turbine is drivingly connected to the high pressure compressor via a first rotor shaft, and the low pressure turbine is drivingly connected to both the fan assembly and the booster via a second rotor shaft.

The fan assembly includes a plurality of circumferentially spaced apart fan blades extending radially outwardly from a rotor disk. The fan blades generally comprise an airfoil section and an integral dovetail root section. The dovetail section is slidably received in a complimentary configured dovetail slot formed in the rotor disk so as to attach the blade to the rotor disk. Fan blades are typically made of either a metal, such as titanium, or a composite material.

Known fan assemblies are susceptible to foreign object damage, e.g., damage resulting from the ingress of foreign objects such as birds or hailstones. If a large foreign object impacts a fan blade, the fan blade, or a portion thereof, could break off from the rotor disk. A detached fan blade could damage adjacent fan blades and create a large imbalance in the fan assembly. Furthermore, if not contained by the fan casing, a detached fan blade could cause considerable damage to the aircraft powered by the engine. To reduce the amount of blade material lost during an ingestion event, it is known to design fan assemblies so as to permit limited rotation of the blade root section within the dovetail slot in response to an extreme force exerted on the blade. This rotation will often prevent breakage of the blade at its base.

During engine operation, ambient airflow is channeled between the rotating blades and pressurized thereby for generating thrust for powering the aircraft in flight. A radially inner flowpath boundary for the airflow channeled between the blades is provided by fan platforms located between adjacent fan blades, near the rotor disk. It is known to produce fan blades having integrally formed platforms. However, this means that the centrifugal loads from both the fan blade airfoils and the platforms must be carried by the fan blade dovetails, which requires that the dovetails be suitably large, which in turn requires a suitably large rotor disk for accommodating all of the centrifugal loads within acceptable stress limits. Furthermore, damage to such an integrally formed platform will often require replacement of the entire blade. And it is impractical from a manufacturing standpoint to integrally form the platforms with the blade in the case of composite fan blades.

Accordingly, fan assemblies have been developed using discrete platforms independently joined to the rotor disk between adjacent fan blades. These separate platforms must have suitable strength for accommodating both centrifugal loads and impact loads, such as those due to a bird strike, during operation.

One such configuration is a composite platform comprising a structural body with laterally-extending wings. The composite platform is frangible to prevent damage to the fan blades in the case of foreign object ingestion. While this type of platform is effective, it usually requires a box-shaped configuration to provide adequate structural strength, making it larger than desired for aerodynamic efficiency purposes. Furthermore, the composite construction is relatively expensive to produce.

Accordingly, there is a need for a compact, easily manufactured, inexpensive fan platform that does not limit the rotation capability of the adjacent fan blades.

BRIEF DESCRIPTION OF THE INVENTION

This need is addressed by the present invention, which provides a metallic fan platform with laterally and radially extending frangible wings.

According to one aspect of the invention, a platform is provided for use between adjacent fan blades joined to a rotor disk to provide an inner flowpath boundary. The platform includes: a metallic arcuate body with opposed forward and aft ends and opposed lateral edges; and a pair of frangible wings that extend from the lateral edges laterally and radially beyond the body.

According to another aspect of the invention, a fan rotor assembly includes: a rotor including an annular array of dovetail slots; an array of blades each having a dovetail engaged in one of the dovetail slots of the rotor, and an airfoil extending radially outward from the dovetail wherein a plurality of spaces are present between adjacent ones of the fan blades; an array of platforms disposed in the spaces between adjacent fan blades, each platform having: a metallic arcuate body with opposed forward and aft ends and opposed lateral edges; and a pair of frangible wings that extend from the lateral edges laterally and radially beyond the body towards the fan blades.

BRIEF DESCRIPTION OF THE DRAWINGS

The invention may be best understood by reference to the following description taken in conjunction with the accompanying drawing figures in which:

FIG. 5 is a an axial cross-sectional view of a portion of a fan rotor in a normal operating condition;

FIG. 6 is a an axial cross-sectional view of a portion of a fan rotor during a foreign object impact.

DETAILED DESCRIPTION OF THE INVENTION

Figure 1:
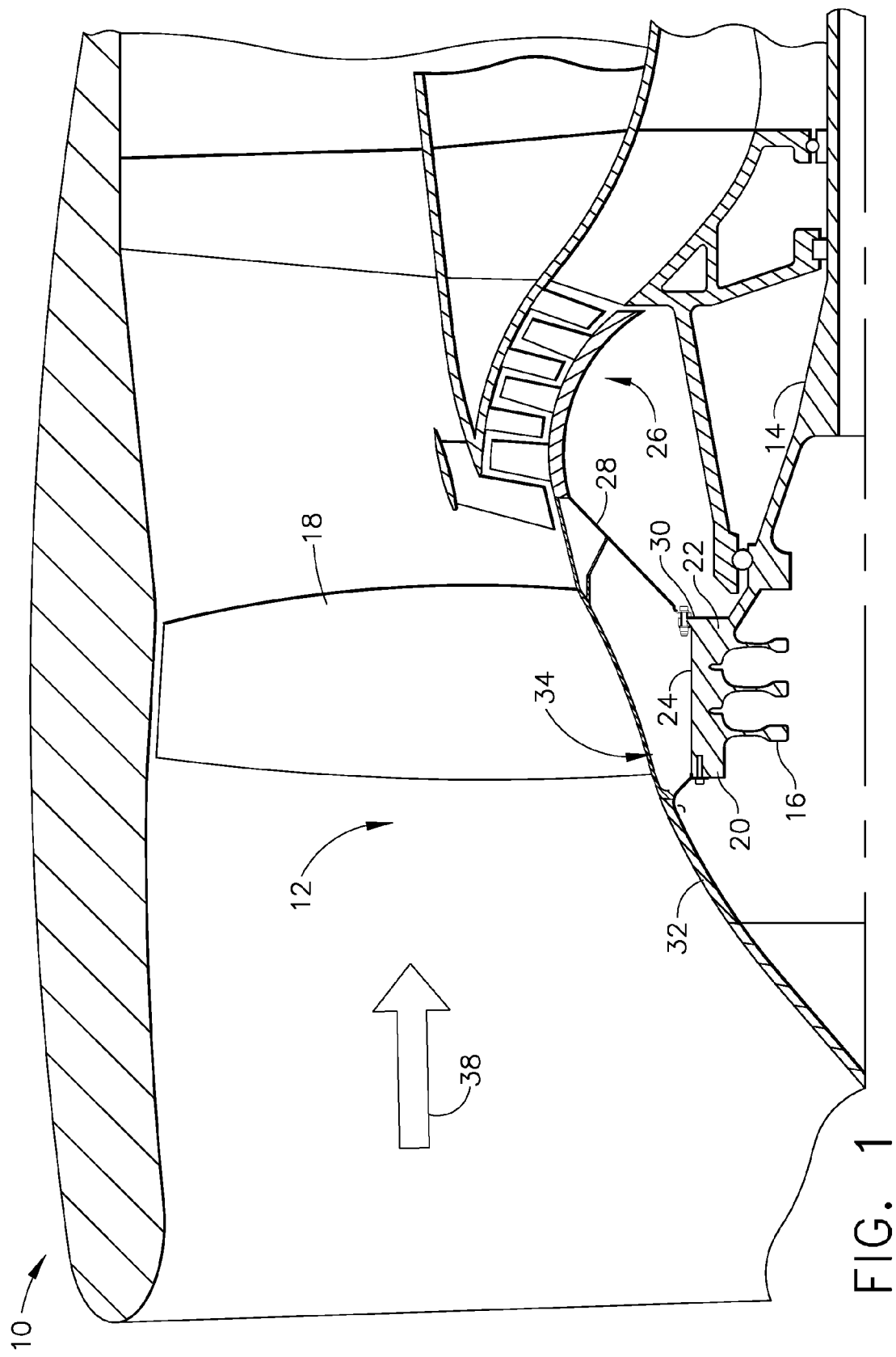
FIG. 1 is a partial cross-sectional view of an exemplary turbofan gas turbine engine including fan platforms constructed according to an aspect of the present invention.

Referring to the drawings wherein identical reference numerals denote the same elements throughout the various views, FIG. 1 shows an exemplary turbofan gas turbine engine 10 used for powering an aircraft in flight. The engine 10 includes a fan assembly 12 which is rotated by a conventional fan shaft 14 powered by a conventional low pressure turbine (not shown). The fan assembly 12 includes a rotor disk 16 from which extends radially outwardly a plurality of circumferentially spaced apart fan or rotor blades 18 (only one shown in FIG. 1). The rotor blades 18 may be metallic or nonmetallic. For example, they may be made from a carbon fiber-epoxy composite or other similar material. The rotor disk 16 includes axially spaced apart forward and aft ends 20 and 22, respectively, and a radially outer surface 24 extending therebetween.

Disposed downstream of the fan assembly 12 is a conventional low-pressure compressor or "booster" 26 having axially spaced apart vane and blade rows, with the blades thereof being joined to a booster spool or shaft 28. The booster shaft 28 is suitably fixedly joined to the rotor disk aft side 22 by a plurality of bolts 30. A spinner 32 is joined to the rotor disk forward side 20 to provide an aerodynamic flow path for air 38 entering the fan assembly 12.

The present invention includes a plurality of discrete platforms 34 (only one of which is shown in FIG. 1) that are provided between the fan blades 18, with each platform 34 being disposed between respective adjacent ones of the fan blades 18 and radially beyond the rotor disk 16. Each of the platforms 34 has a radially outer surface 36 extending between the respective adjacent fan blades 18 so as to collectively define an inner flowpath boundary for channeling air 38 between the fan blades 18. Thus, the platforms 34 function to maintain the engine flowpath definition between the spinner 32 and the booster 26.

Figure 2:
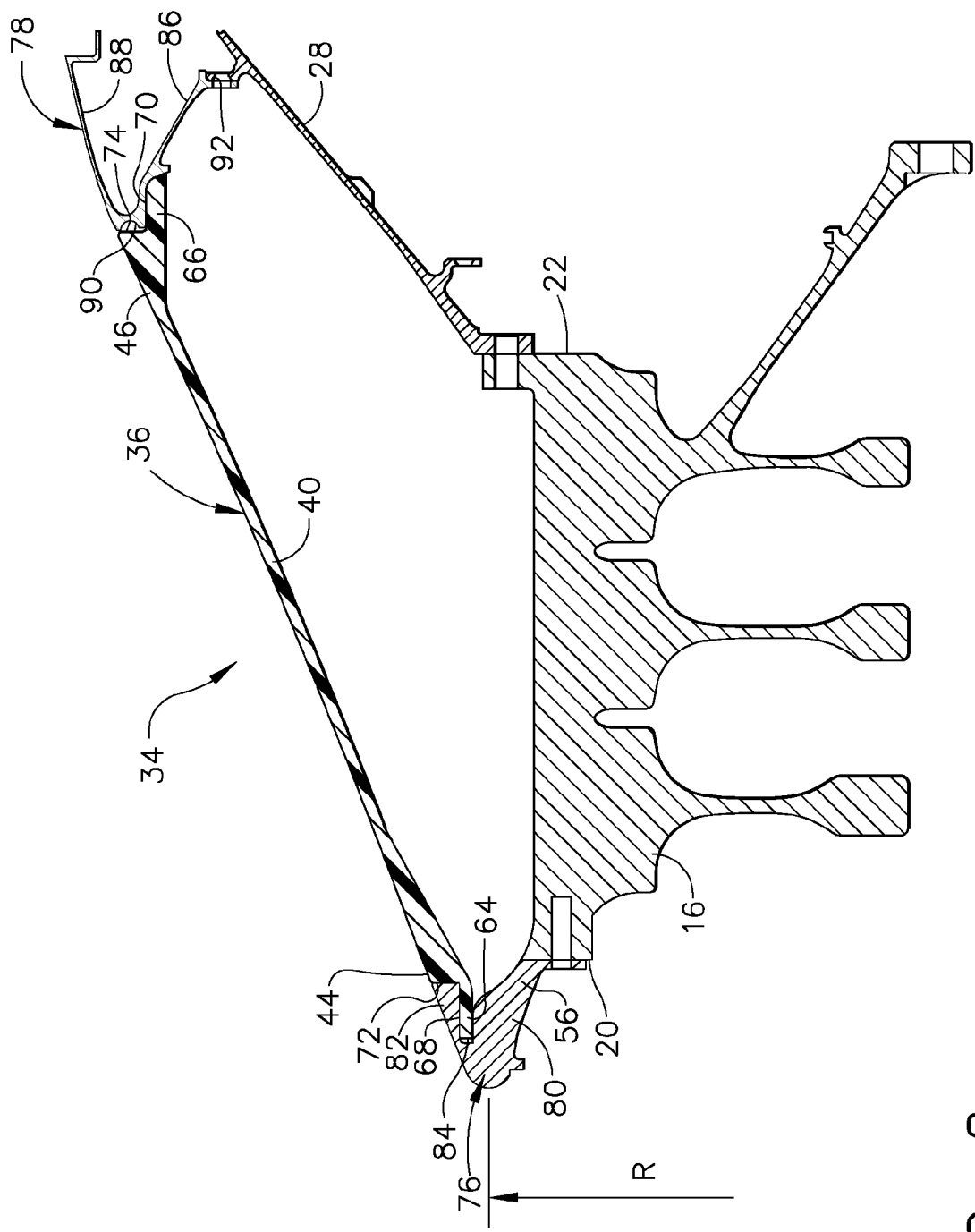
FIG. 2 is an enlarged cross-sectional view of a fan platform constructed according to an aspect of the present invention.
Figure 3:
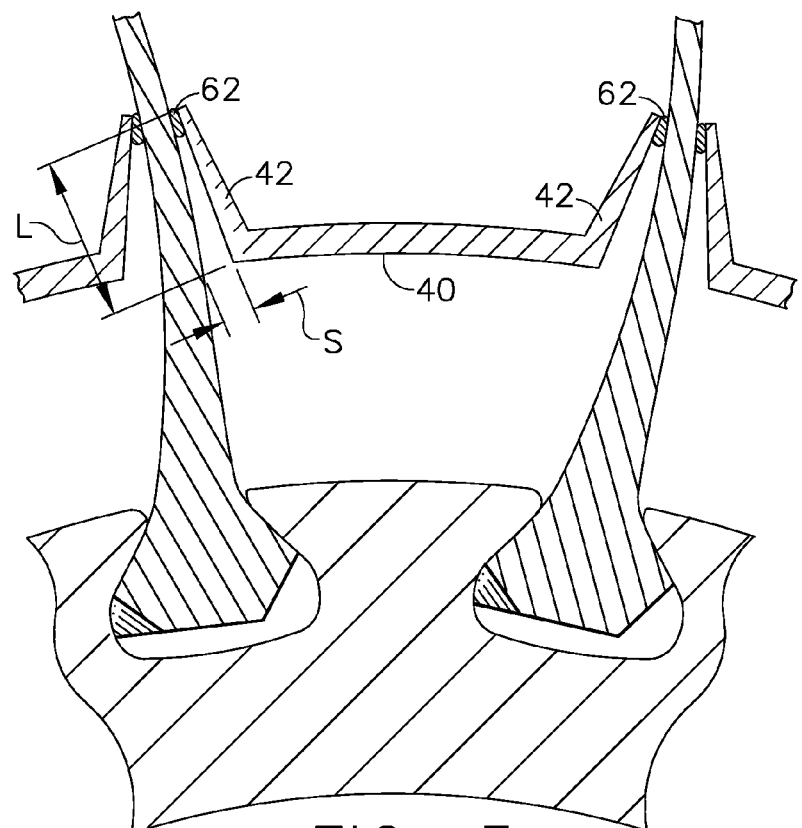
FIG. 3 is a an axial cross-sectional view of a portion of a fan rotor.
Figure 4:
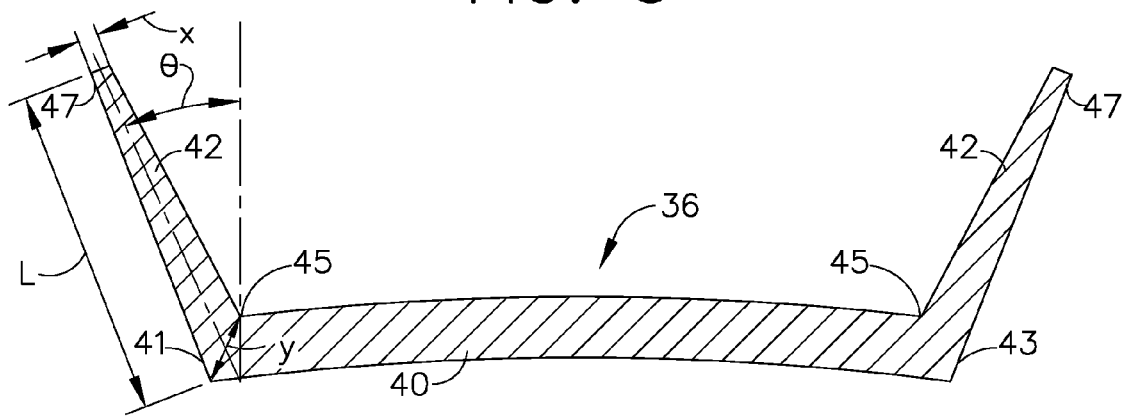
FIG. 4 is an axial cross-sectional view of the fan platform shown in FIG. 2.

Referring to FIGS. 2-4, a single fan platform 34 is shown in greater detail. Each platform 34 is a functionally unitary member comprising a body 40 which defines the outer surface 36 and a pair of outwardly-extending wings 42 which are joined to the body 40 in a substantially U-shaped configuration in cross-section (see FIG. 4). To reduce the overall cost and manufacturing complexity of the platforms 34 while maintaining suitable strength thereof, the platforms 34 are preferably made from a metal alloy. Examples of alloys suitable for gas turbine engine applications include aluminum, steel, and titanium alloys. The platforms 34 may be fabricated by conventional methods such as casting, forging, and/or machining, and each platform 34 may be built up from smaller components or may be a once-piece integral or unitary component. As best seen in FIG. 2, the platform 34 has a forward end 44 disposed near the disk forward end 20, and an axially opposite aft end 46 disposed near the disk aft end 22. The body 40 contributes the bulk of the platform's mass and consequently provides the platform 34 with the necessary strength to carry its centrifugal load. In the illustrated example the body 40 is a single-walled arcuate structure which is a partial body of revolution, however the specific physical configuration may be modified to suit a particular application. The body 40 includes spaced-apart lateral edges 41 and 43 running between the forward and aft ends 44 and 46.

The platform 34 has an arcuate forward mounting flange 64 extending axially outward from the forward end 44 and an aft mounting flange 66 extending axially outward from the aft end 46. The forward and aft mounting flanges 64, 66 are configured so as to define forward and aft radially outward-facing abutment surfaces 68 and 70, respectively, and forward and aft axially facing abutment surfaces 72 and 74, respectively.

The flowpath surface portion 42 provides the necessary strength to meet fan overspeed requirements, low cycle fatigue, and ingestion requirements. Metal alloys used to construct the platforms 34, including the wings 42, are typically more ductile and less brittle than nonmetallic composites the fan blades 18 may be made from. As a result if the platforms 34 were simple cylindrical sections they would tend to damage the fan blades 18 in the event of hard impact crush loads between a fan blade 18 and the platform 34 that can occur during ingestion events. Accordingly, the lateral extent of the body 40 is made less than the distance between adjacent fan blades 18, so that there is a small lateral spacing "S" between the body 40 and the adjacent fan blades 18. Also, the wings 42 are provided and configured so as to be frangible, significantly deforming and/or breaking off in the case of movement of the fan blades 18. This characteristic may be provided through selection of the physical dimensions of the wings 42. For example, The wings 42 are tapered from their roots 45 to their tips 47. More specifically, the wings 42 have a first thickness "x" at their tips 47, and a second thickness "y" at their roots 45. The second thickness y is greater than the first thickness x. Stated another way, a "taper ratio" of the wings 42 defined as $\lambda=x/y$ is less than 1. The lean angle of the wings 42 is also selected to encourage bending deflection of the wings 42 in response to movement of the fan blades 18. Specifically, a lean angle $\theta$ between each wing 42 and the outer surface 36 is less than 90 degrees. Finally, the length "L" of each wing 42 is substantially greater than the lateral spacing "S" between the body 40 and the fan blade 18. These parameters (taper ratio, wing angle and length ratio) may be varied to suit a particular application.

Figure 7:
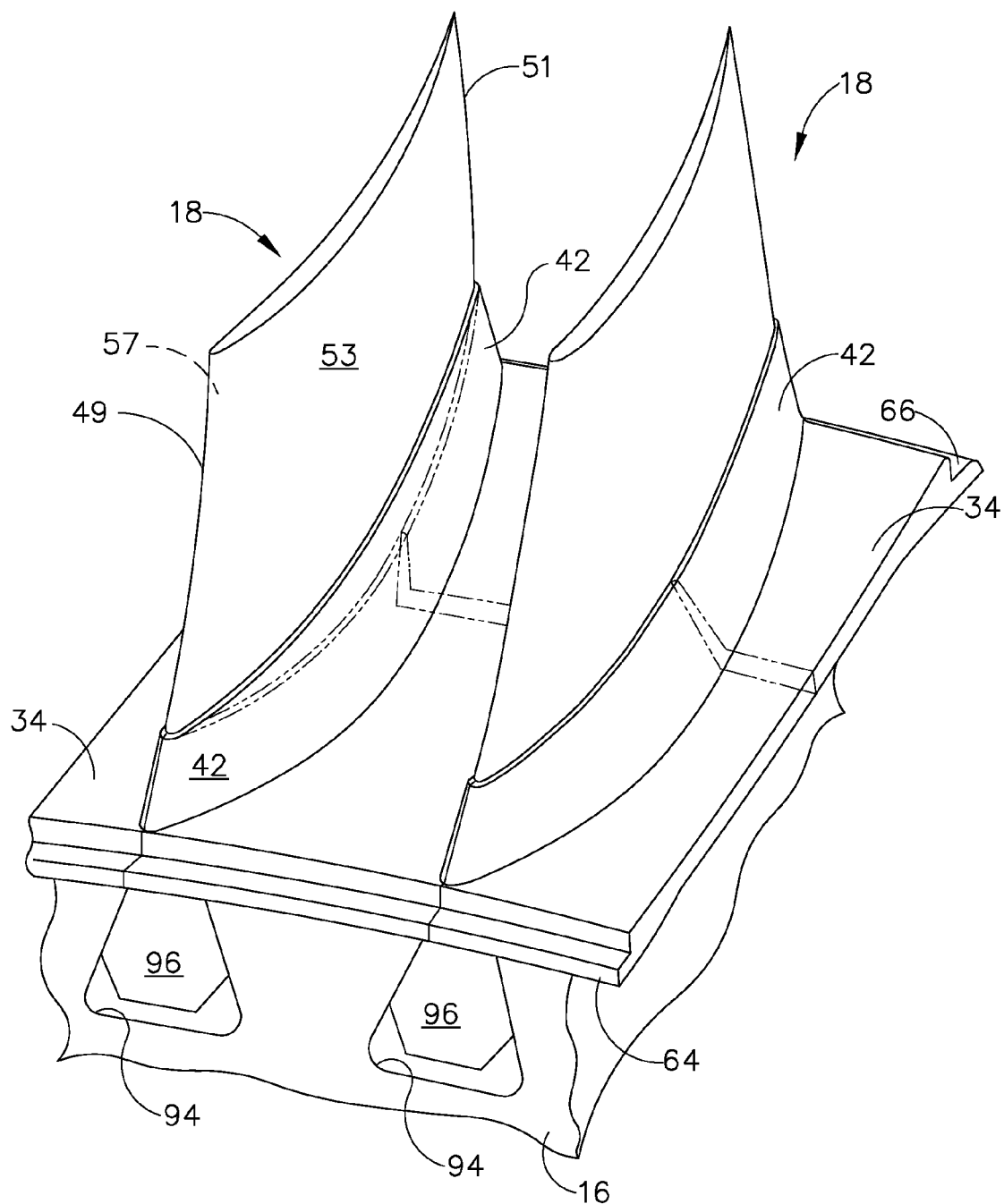
FIG. 7 is a perspective view of a portion of a fan rotor.

As best seen in FIG. 7, each fan blade 18 has a leading edge 49 and a trailing edge 51. Opposed convex and concave sides 53 and 57, respectively, extend between the leading edge 49 and the trailing edge 51. The fan blades 18 incorporate a significant amount of camber. The wings 42 are contoured so as to follow this camber, and such that adjacent wings 42 will meet each other at the leading and trailing edges 49 and 51 of the fan blades 18. If desired, the lateral edges 41 and 43 of the body 43 may also be contoured to follow the camber of the fan blades 18; in other words one lateral edge 41 would be concave and the other lateral edge 43 would be convex.

The outer lateral edge of each wing 42 is provided with a resilient seal member 62 to seal fan blade air leakage during engine operation. The edge seals 62 may be bonded to the wings 42 with an adhesive, and are made of a suitable material such as silicone or another elastomeric material.

As shown in FIG. 2, the platform 34 is retained by a forward support ring 76 and an aft support ring 78. The forward support ring 76 is an annular member including an inner segment 80 which is radially spaced apart from an outer segment 82 such that an annular, aft-facing groove 84 is defined therebetween. The forward support ring 76 is fixedly joined at its distal end to the forward end 20 of the rotor disk 16 by a plurality of bolts, for example (not shown). The radially outer segment 82 overlaps the forward mounting flange 64 and engages the forward radial abutment surface 68, thereby retaining the forward end 44 of the platform 34 against radially outward movement due to centrifugal force upon rotation of the rotor disk 16 during engine operation. Furthermore, the distal end of the outer segment 82 abuts the forward axially facing abutment surface 72 to restrain the platform 34 against forward axial movement. Optionally, the forward support ring 76 may be an integral portion of the otherwise conventional spinner 32. The metal construction of the platform 34 with the single-walled body 40 allows the radial height "R" of the forward support ring 76 to be significantly smaller than would be the case for a prior art platform. This leads to increased aerodynamic efficiency of the fan assembly 12.

The aft support ring 78 is an annular member. In the illustrated example it is substantially V-shaped in cross-section and includes a radially inner segment 86 and a radially outer segment 88 joined together at an intersection that defines an abutment 90. The inner segment 86 is fixedly joined at its distal end to a mounting flange 92 formed on the booster shaft 28. The abutment 90 overlaps the aft mounting flange 66 and engages the aft radial abutment surface 70, thereby retaining the aft end 46 of the platform 34 against radially outward movement due to centrifugal force upon rotation of the rotor disk 16 during engine operation. The abutment 90 also engages the aft axially facing abutment surface 74 so as restrain the platform 34 against axial movement in the aft direction.

Referring to FIGS. 5 and 6, the rotor disk 16 includes a plurality of circumferentially spaced apart axial dovetail slots 94 which extend radially inwardly from the disk outer surface 24, with the disk portions between the dovetails slots 94 also being known as dovetail posts. Each of the fan blades 18 includes an integral root section 96 that is in the form of a complementary axial-entry dovetail. The dovetail root sections 96 are disposed in respective ones of the dovetail slots 94 for attaching the fan blades 18 to the rotor disk 16. As is known in the art, the dovetail slots 94 and root sections 96 are designed so as to permit limited rotation of the root section 96 within the dovetail slot 94 in response to an extreme force exerted on the blade 18. This blade rotation capability substantially reduces the blade's susceptibility to foreign object damage.

As shown in FIG. 5, which represents the fan assembly 12 under normal operating conditions, the body 40 is sized and configured to provide adequate clearance with the rotor disk 16 and the adjacent blades 18 such that blade rotation capability is not overly hindered by binding between the platform 34 and the blades 18 or rotor disk 16. Thus, as shown in FIG. 6, if one of the fan blades 18 (the leftmost blade in the figure) is struck by a foreign object, the blade 18 will rotate within its dovetail slot 94 in response to the impact. As the blade 18 rotates, the wings 42 will deform and/or break off, allowing the blade 18 to rotate throughout its rotation capability, which is typically about 18 degrees. Although the wings 42 are crushed during an ingestion event, the body 40, which provides the bulk of the platform's mass, stays relatively intact. Thus, very little of the platform's mass is lost so that most of the function of defining an inner flowpath boundary is retained.

The platform 34 and fan assembly 12 described above has several advantages over the prior art. In particular, the metallic platform 34 enjoys the benefit of reduced manufacturing time and lower part cost, while the frangible wings 42 and the simply supported restrain does not affect composite fan blade rotational requirements during extreme dynamic events. Furthermore, the platform configuration allows for reduced size of the retention structure at its leading edge, thus increasing both composite fan efficiency and fan flow.

The foregoing has described a discrete, metallic fan platform that does not limit the rotation capability of the adjacent fan blades and a process for making such a platform. While specific embodiments of the present invention have been described, it will be apparent to those skilled in the art that various modifications thereto can be made without departing from the spirit and scope of the invention as defined in the appended claims

What is claimed is:

1. A fan rotor assembly comprising:
    a rotor including an annular array of dovetail slots;
    an array of blades each having a dovetail engaged in one of the dovetail slots of the rotor, and an airfoil extending radially outward from the dovetail wherein a plurality of spaces are present between adjacent ones of the fan blades;
    an array of platforms disposed in the spaces between adjacent fan blades, each platform comprising:
    a metallic arcuate body with opposed forward and aft ends and opposed lateral edges; and
    a pair of frangible wings that extend from the lateral edges laterally and radially outwards away from the rotor beyond the body towards the fan blades, wherein a gap is present between each lateral edge of each of the platforms and the adjacent fan blade.

2. The rotor assembly of claim 1 wherein the body and the wings form part of a unitary member.

3. The rotor assembly of claim 1 wherein one of the lateral edges has a concave curvature and the other lateral edge has a convex curvature.

4. The rotor assembly of claim 1 wherein one of the wings has a concave curvature and the other wings has a convex curvature.

5. The rotor assembly of claim 1 wherein a lean angle between each wing and an outer surface of the body is less than 90 degrees.

6. The rotor assembly of claim 1 wherein a ratio of the thickness at the tip of each wing to the thickness of the root of each wing is less than one.

7. The rotor assembly of claim 1 wherein a radial length of each wing is substantially larger than the size of the gap.

8. The rotor assembly of claim 1 further comprising a resilient seal member disposed between a tip of the each of the wings and the adjacent fan blade.

9. The rotor assembly of claim 1 wherein each platform is mounted to the rotor through a forward mounting flange extending axially outward from a forward end of the platform and an aft mounting flange extending axially outward from an aft end of the platform.

* * * * *